Jan. 14, 1964   A. N. DE SAUTELS   3,118,091
CONTROL APPARATUS
Filed Dec. 10, 1959
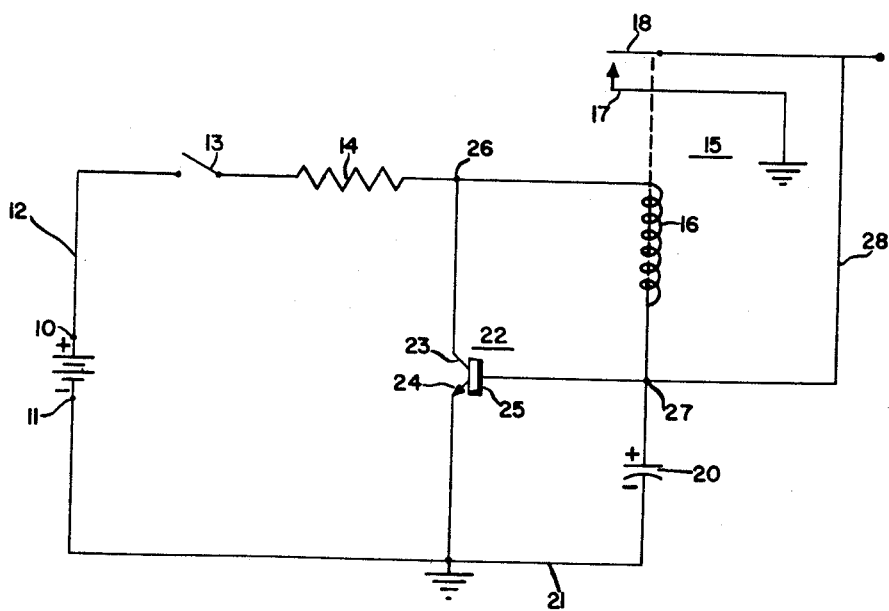
INVENTOR.
ALBERT N. DE SAUTELS
BY
Roger W. Jensen
ATTORNEY

United States Patent Office 3,118,091
Patented Jan. 14, 1964

3,118,091
CONTROL APPARATUS
Albert N. De Sautels, Minneapolis, Minn., assignor to Minneapolis-Honeywell Regulator Company, Minneapolis, Minn., a corporation of Delaware
Filed Dec. 10, 1959, Ser. No. 858,743
5 Claims. (Cl. 317—154)

This invention relates to the improvement of relay energizing circuits and particularly to relay circuits where it is imperative that the relay contacts close. It is well known in the art that sticking, pitted, or dirty relay contacts will cause erratic or improper operation of relay circuits.

It is one object of this invention, therefore, to provide a relay control circuit that will minimize the chance of faulty relay operation.

Another object of this invention is to provide a relay control circuit that will operate automatically whenever a relay fault occurs.

A further object of this invention is to provide a relay control circuit that is deactivated when the relay is operating properly.

These and other objects of my invention will become apparent to those skilled in the art upon consideration of the accompanying specification, claims, and drawing of which:

The single FIGURE is a schematic diagram of an embodiment of this invention.

Referring to the drawing, there is shown an activation, or energization, source, in this case a battery, with terminals 10 and 11. Terminal 10 is connected, by means of a conductor 12, to one side of a switch 13. The other side of switch 13 is connected, by means of a resistor 14; a condition sensing means, in this case relay 15 having a winding 16, a stationary contact 17 and a movable contact 18; an energy storage means, for example a capacitor 20; and a ground conductor 21, to terminal 11 of the activation source.

Capacitor 20 and a current conrtol device 22, in this case a transistor with a collector 23, an emitter 24 and base 25, form a control means for the relay 15, and insure that movable contact 18 will close with stationary contact 17 when the winding 16 is energized.

Collector 23, of transistor 22, is directly connected to a junction 26 between resistor 14 and relay winding 16, the emitter 24 is directly connected to ground conductor 21, and the base 25 is directly connected to a junction 27 between relay winding 16 and capacitor 20.

Movable relay contact 18 is connected, by means of conductor 82, to junction 27, and stationary contact 17 is grounded.

Operation

The relay control apparatus of the drawing comprises, in a broad sense, a means for automatically pulsing a relay winding in the event the relay contacts do not close when the winding is initially energized.

In considering the specific operation of the circuit of the drawing, assume that activation energy has just been applied to the circuit by the closing of switch 13. Current then flows from terminal 10 of the battery, through conductor 12, switch 13, resistor 14, winding 16, capacitor 20 and ground conductor 21 to terminal 11 of the battery, energizing winding 16. Assume also that for some reason, such as dirt or pitting, the relay contacts 17 and 18 do not close. Under these conditions the winding energizing current, flowing through capacitor 20, will charge this capacitor to the polarity shown making junction point 27 positive with respect to ground. As capacitor 20 charges it biases the base 25 of transistor 22 positive with respect to the emitter 24 and turns the transistor to its "on" or conducting state. When transistor 22 conducts, current flows from battery terminal 10, through conductor 12, switch 13, resistor 14, junction 26, collector 23 to emitter 24 of transistor 22, and ground conductor 21, to battery terminal 11. This current flow through transistor 22 effectively shorts out relay winding 16 and deenergizes the relay. The transistor will continue to conduct, discharging capacitor 20, until the charge on the capacitor is insufficient to maintain the transistor in its "on" state. The discharge path for capacitor 20 is from the positive side of the capacitor, through junction 27, base 25 to emitter 24 of transistor 22, and ground conductor 21, to the negative side of the capacitor. When the transistor 22 is turned to it "off" ord non-conducting state, due to the discharge of capacitor 20, the relay winding 16 will again be energized because it is no longer shorted out, and the cycle will repeat.

Assume now that relay contacts 17 and 18 close. In this condition the capacitor 20 is shorted by the conduction path through the relay contacts, the transistor 22 is in its "off" state due to the fact that the emitter and base are at approximately the same potential, that is, ground, and the relay winding is energized and will remain so unless the relay contacts open.

It is to be understood that while I have shown a specific embodiment of my invention, this is for the purpose of illustration only and that my invention is to be limited solely by the scope of the appended claims.

I claim as my invention:

1. Control apparatus of the class described comprising: relay means having a winding and at least one stationary and one movable contact; energizing potential means; switch means having first and second terminals; circuit means connecting one side of said potential means to the first terminal of said switch means; resistance means; circuit means connecting said resistance means from the second terminal of said switch means to one side of the relay winding; capacitance means; circuit means connecting said capacitance means from the other side of the relay winding to the other side of the potential means; current control means having first, second and third electrodes, the first electrode being connected to said one side of the relay winding, the second electrode being connected to said other side of the relay winding, and the third electrode being connected to said other side of the potential source; circuit means connecting said movable relay contact to said other side of the relay winding; and circuit means connecting said stationary relay contact to said other side of the potential source.

2. Control apparatus of the class described comprising: relay means having a winding and at least one stationary and one movable contact; energizing potential means; switch means having first and second terminals; circuit means connecting one side of said potential means to the first terminal of said switch means; resistance means; circuit means connecting said resistance means from the second terminal of said switch means to one side of the relay winding; capacitance means; circuit means connecting said capacitance means from the other side of the relay winding to the other side of the potential means; semiconductor means having collector, base and emitter electrodes, the collector electrode being connected to said one side of the relay winding, the base electrode being connected to said other side of the relay winding, and the emitter electrode being connected to said other side of the potential source; circuit means connecting said movable relay contact to said other side of the relay winding; and circuit means connecting said stationary relay contact to said other side of the potential source.

3. Control apparatus of the class described comprising: relay means, said relay means having a winding and at least one set of contacts; activation means, said activation means having a source of potential for energizing said relay means; energy storage means; means serially connecting said relay winding and said energy storge means across said activation means; switch means connected across said relay winding and said energy storage means and operable in response to a predetermined energy storage in said energy storage means; and means connecting said relay contacts across said energy storage means.

4. Control apparatus of the class described comprising: relay means, said relay means having a winding and a set of contacts; activation means for energizing the relay winding; energy storage means; means connecting said activation means, said relay winding and said energy storage means in a series relationship; current control means having an input electrode, an output electrode, and a control electrode, said input and output electrodes connecting said current control means across said serially connected relay winding and capacitance means; means connecting said control electrode intermediate said relay winding and said capacitance means; and means connecting said relay contacts across said capacitance means.

5. Control apparatus of the class described comprising: relay means having a winding and at least one set of contacts; activation means having a source of potential for energizing said relay means; semiconductor means having collector, base, and emitter electrodes, said collector and base electrodes being connected across said relay winding; capacitance means; circuit means connecting said capacitance means across the base and emitter electrodes of said semiconductor means; circuit means connecting said activation means across the collector and emitter electrodes of said semiconductor means; and means connecting the contacts of said relay means in circuit with the relay winding whereby the contacts, when operative, maintain the relay windings energized.

References Cited in the file of this patent

UNITED STATES PATENTS

| | | |
|---|---|---|
| 2,577,137 | Low | Dec. 4, 1951 |
| 2,780,752 | Aldrich et al. | Feb. 5, 1957 |

FOREIGN PATENTS

| | | |
|---|---|---|
| 815,361 | Great Britain | June 24, 1959 |